(12) United States Patent
Seo et al.

(10) Patent No.: US 8,449,420 B2
(45) Date of Patent: May 28, 2013

(54) POWER TRAIN FOR HYBRID VEHICLE

(75) Inventors: Kangsoo Seo, Gyeonggi-do (KR);
Hyutae Shim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 735 days.

(21) Appl. No.: 12/619,351

(22) Filed: Nov. 16, 2009

(65) Prior Publication Data

US 2010/0227723 A1    Sep. 9, 2010

(30) Foreign Application Priority Data

Mar. 9, 2009   (KR) .................. 10-2009-0019723

(51) Int. Cl.
*F16H 3/72* (2006.01)
*F16H 37/06* (2006.01)
*B60K 6/445* (2007.10)
*B60K 1/00* (2006.01)

(52) U.S. Cl.
USPC .............. 475/5; 475/4; 180/65.235; 180/65.6

(58) Field of Classification Search
USPC ... 475/1–10; 180/65.235, 65.6, 65.7; 903/910
See application file for complete search history.

(56) References Cited

U.S. PATENT DOCUMENTS

| | | | | |
|---|---|---|---|---|
| 7,192,373 B2 * | 3/2007 | Bucknor et al. | | 475/5 |
| 7,300,374 B2 * | 11/2007 | Bucknor et al. | | 475/5 |
| 2008/0125265 A1 * | 5/2008 | Conlon et al. | | 475/5 |
| 2011/0111907 A1 * | 5/2011 | Kim et al. | | 475/5 |

FOREIGN PATENT DOCUMENTS

| | | | |
|---|---|---|---|
| JP | 2005-075095 A | | 3/2005 |
| JP | 2006-282069 A | | 10/2006 |
| JP | 2007314034 A | * | 12/2007 |
| JP | 2008-114811 A | | 5/2008 |
| KR | 10-2007-0110552 | | 11/2007 |
| KR | 10-2008-0027638 | | 3/2008 |
| KR | 10-2008-0038802 A | | 5/2008 |
| KR | 2008-0038802 A | | 5/2008 |
| KR | 10-0863634 B1 | | 10/2008 |
| KR | 10-2009-0022150 A | | 3/2009 |

* cited by examiner

*Primary Examiner* — Tisha Lewis
(74) *Attorney, Agent, or Firm* — Edwards Wildman Palmer LLP; Peter F. Corless; Kongsik Kim

(57) ABSTRACT

Disclosed is a power train for a hybrid vehicle that allows for multiple mode driving, which is combined with a way of driving at a fixed gear ratio such as the shift stages of a common transmission, and high-efficiency driving, thereby improving fuel efficiency of the vehicle.

12 Claims, 10 Drawing Sheets

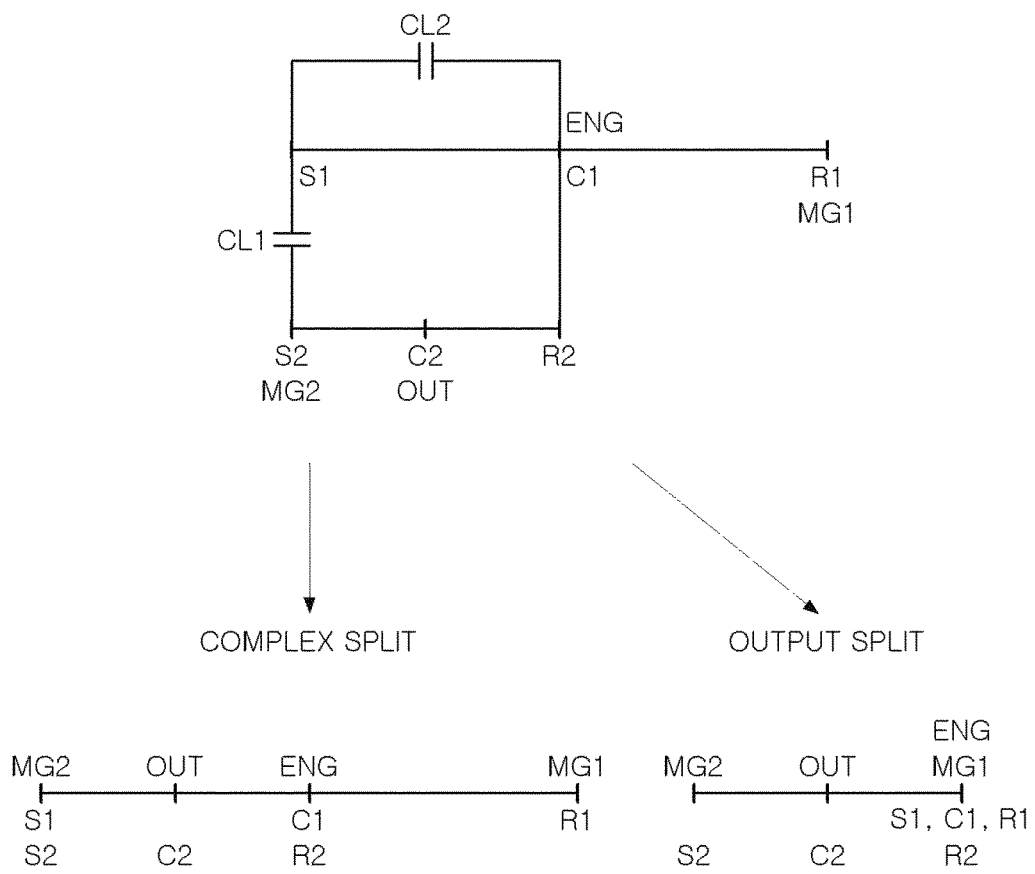

| ITEM | | CL1 | CL2 | BK1 | BK2 |
|---|---|---|---|---|---|
| EV | | | ● | ● | |
| COMPLEX SPLIT | | ● | | | |
| OUTPUT SPLIT | | | ● | | |
| FIXED GEAR RATIO | FIRST STAGE | ● | | | ● |
| | | | ● | | ● |
| | | | | ● | ● |
| | SECOND STAGE | ● | ● | | |
| | THIRD STAGE | ● | | ● | |

FIG.13
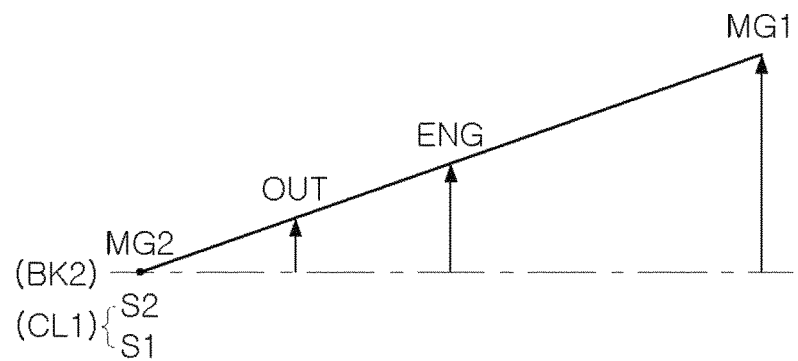
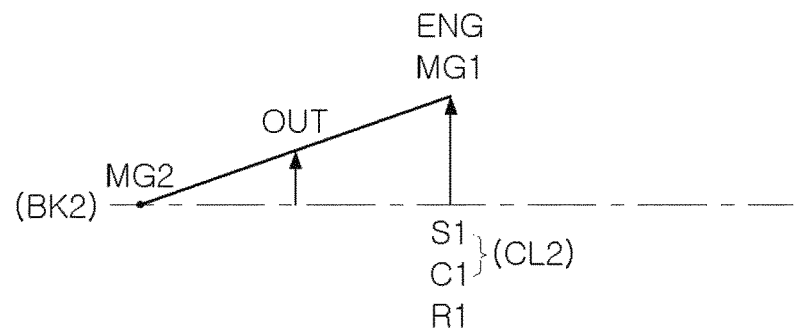
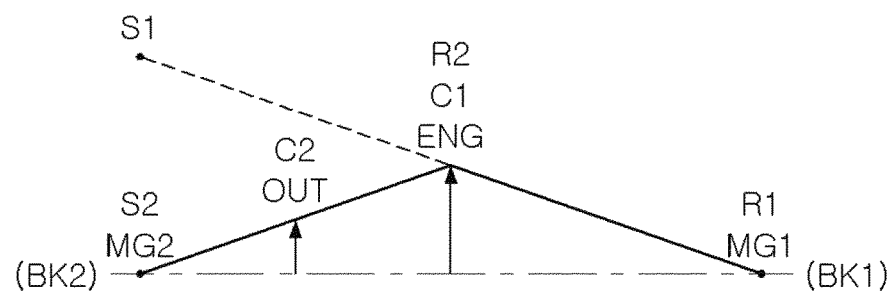

POWER TRAIN FOR HYBRID VEHICLE

CROSS-REFERENCE TO RELATED APPLICATIONS

The present application claims priority to Korean Patent Application Number 10-2009-0019723 filed Mar. 9, 2009, the entire contents of which application is incorporated herein for all purposes by this reference.

BACKGROUND

1. Technical Field

The present disclosure relates to a power train for a hybrid vehicle, in more detail a technology for transmitting power from power sources to the driving wheels in a hybrid vehicle equipped with two or more different power sources including an internal combustion engine.

2. Related Art

Hybrid vehicles using an engine and a motor generator improve fuel efficiency of the vehicles by achieving functions of idle stop and regenerative braking, on the basis of a technology of driving the vehicles at low velocity by using power from the motor generator having relatively excellent low-velocity torque characteristics and driving the vehicles at high velocity by using power from the engine having relatively excellent high-velocity characteristics.

Further, hybrid vehicles do not produce exhaust gas from the engine when being driven only by a motor generator, which is recognized as an environmental-friendly vehicle technology having advantages of improving fuel efficiency and reducing exhaust gas.

A power split type device has been known in the field of power trains for hybrid vehicles, which is classified into a single mode way and a multiple mode way. The single mode way does not need an operational element for shift control, such as a clutch or a brake, but the efficiency decreases in a high-velocity traveling, such that fuel efficiency is low and an additional torque amplifier is required to be applied to large-sized vehicles.

On the other hand, the multiple mode way can be designed to be able to ensure efficiency in high-velocity traveling and amplify torque by itself in accordance with the configuration, such that it can be applied to medium- and large-sized vehicles.

The information disclosed in this Background section is only for enhancement of understanding of the general background of the invention and should not be taken as an acknowledgement or any form of suggestion that this information forms the prior art already known to a person skilled in the art.

BRIEF SUMMARY OF THE DISCLOSURE

Various aspects of the present invention are directed to provide a power train for a hybrid vehicle that allows for multiple mode driving, which is combined with a way of driving at a fixed gear ratio such as the shift stages of a common transmission, and high-efficiency driving, thereby improving fuel efficiency of the vehicle.

In an aspect of the present invention, a power train for a hybrid vehicle includes: a first planetary gear set that has rotary elements; a second planetary gear set that has rotary elements including a rotary element connected with at least one of the rotary elements of the first planetary gear set; a first clutch that is configured to connect/disconnect one of the rotary elements of the first planetary gear set with/from one of the rotary elements of the second planetary gear set; and a second clutch that is configured to connect/disconnect the rotary elements of the first planetary gear set. At least two or more independent power sources and output element are connected to some of the rotary elements of the first and second planetary gear sets.

Preferably, the power source may include an engine and a first motor generator that are connected to the first planetary gear set, and a second motor generator that is connected to the second planetary gear set, and the output element may be connected to the second motor generator. In this case, the first planetary gear set and the second planetary gear set, and the first motor generator and the second motor generator are coaxially arranged, respectively.

Suitably, one rotary element of the first planetary gear set may be directly connected with one rotary element of the second planetary gear set, and the first clutch may be connected with one of the other rotary elements of the first planetary gear set and one of the other rotary elements of the second planetary gear set. In this case, preferably, the engine may be connected with the rotary element, which is directly connected to second planetary gear set, of the first planetary gear set, and the output element may be connected to one rotary element, which is not connected with the engine and the first clutch, of the second planetary gear set. Also preferably, the first motor generator may be connected with the rotary element, which is not connected with the first clutch and the rotary elements of the second planetary gear set, of the first second planetary gear set, and the second motor generator may be connected to the rotary element, which is connected with the first clutch, of the second planetary gear set.

In this case, suitably, a first carrier of the first planetary gear set may be directly connected to a second ring gear of the second planetary gear set, the engine may be connected to the first carrier, the first motor generator may be connected to a first ring gear of the first planetary gear set, the second motor generator may be connected to a second sun gear of the second planetary gear set, the first clutch may be configured to connect/disconnect a first sun gear of the first planetary gear set with/from a second sun gear of the second planetary gear set, the second clutch may be configured to connect/disconnect the first sun gear and the first carrier, and the output element may be connected to a second carrier of the second planetary gear set.

Suitably, the power train may further comprises a first brake that is configured to restrain rotation of the rotary element, which is connected with the first motor generator, of the first planetary gear set; and a second brake that is configured to restrain rotation of the rotary element, which is connected with the second motor generator, of the second planetary gear set.

Suitably, a first carrier of the first planetary gear set may be directly connected to a second ring gear of the second planetary gear set, the engine may be connected to the first carrier, the first motor generator may be connected to a first ring gear of the first planetary gear set, the second motor generator may be connected to a second sun gear of the second planetary gear set, the first clutch may be configured to connect/disconnect a first sun gear of the first planetary gear set with/from a second sun gear of the second planetary gear set, the second clutch may be configured to connect/disconnect the first ring gear and the first carrier, and the output element may be connected to a second carrier of the second planetary gear set. In this case, the power train, suitably, may further comprise a first brake that is configured to restrain rotation of the first ring gear connected with the first motor generator; and a second brake that is configured to restrain rotation of the second sun gear connected with the second motor generator.

In another aspect, the present invention provides a power train for a hybrid vehicle that comprises: a first planetary gear set including three rotary elements two of which are connected with an engine and a first motor generator, respectively; a second planetary gear set including three rotary elements two of which are connected with a second motor generator and the first planetary gear set, respectively; an output element that is connected to the second planetary gear set; a first clutch that is configured to connect/disconnect the rotary element of the first planetary gear set that is not connected to the engine and the first motor generator with/from the rotary element of the second planetary gear set that is not connected to the second motor generator and the first planetary gear set; and a second clutch that is configured to connect/disconnect the rotary elements of the first planetary gear set Preferably, the power train may further comprise a first brake that is configured to restrain rotation of the rotary element, which is connected with the first motor generator, of the first planetary gear set; and a second brake that is configured to restrain rotation of the rotary element, which is connected with the second motor generator, of the second planetary gear set.

Suitably, the output element may be connected to the rotary element, which is not connected with the second motor generator and the first planetary gear set, of the rotary elements of the second planetary gear set, and the engine may be connected with the rotary element of the first planetary gear set and the rotary element of the second planetary gear set which are connected with each other. In this case, the first clutch may be configured to connect/disconnect the rotary element, which is connected with the second motor generator, of the second planetary gear set with/from the rotary element, which is not connected with the first motor generator and the engine, of the first planetary gear set. Also, in this case, the second clutch may be configured to connect/disconnect the rotary element, which is connected with the engine, of the first planetary gear set with/from the rotary element, which is connected with the first clutch, of the first planetary gear set.

Preferably, the second clutch may be configured to connect/disconnect the rotary element, which is connected with the engine, of the first planetary gear set with/from the rotary element, which is connected with the first motor generator, of the first planetary gear set.

The present invention allows for multiple mode driving, which is combined with a way of driving at a fixed gear ratio such as the shift stages of a common transmission, and high-efficiency driving within the entire shift ratio of a vehicle, thereby improving fuel efficiency of the vehicle.

The above and other features and advantages will be apparent from or are set forth in more detail in the accompanying drawings, which are incorporated herein, and the following Detailed Description of the Invention, which together serve to explain certain principles of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

FIG. 3 is an operation mode table for the power trains of FIGS. 1 and 2.

FIG. 4 show a simplified configuration of the power train of FIG. 1 and lever analysis diagrams of a complex split mode operation and an output split mode operation thereof.

FIGS. 10 to 14 are lever analysis diagrams of the power train of FIG. 9 according to the operation modes of FIG. 8.

DETAILED DESCRIPTION OF EMBODIMENTS

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
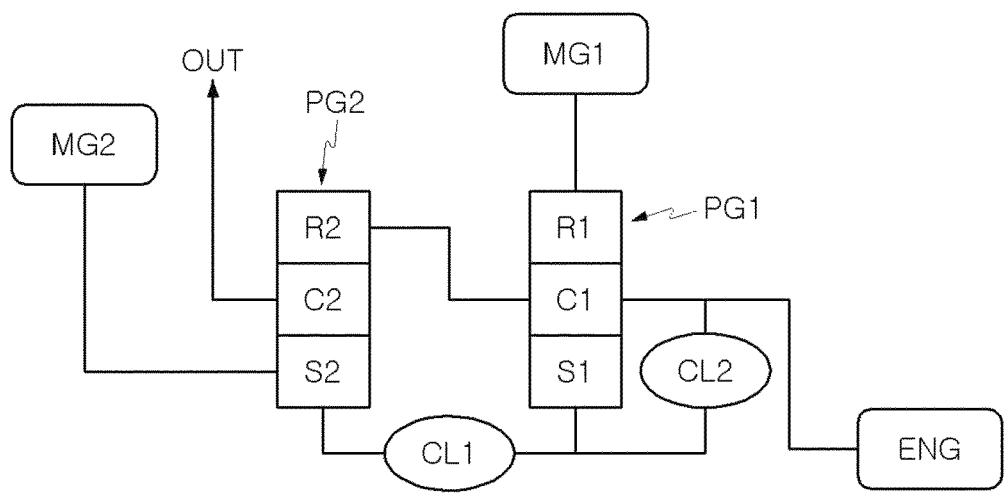
FIG. 1 is a diagram illustrating the configuration of a power train for a hybrid vehicle according to an embodiment of the present invention.
Figure 2:
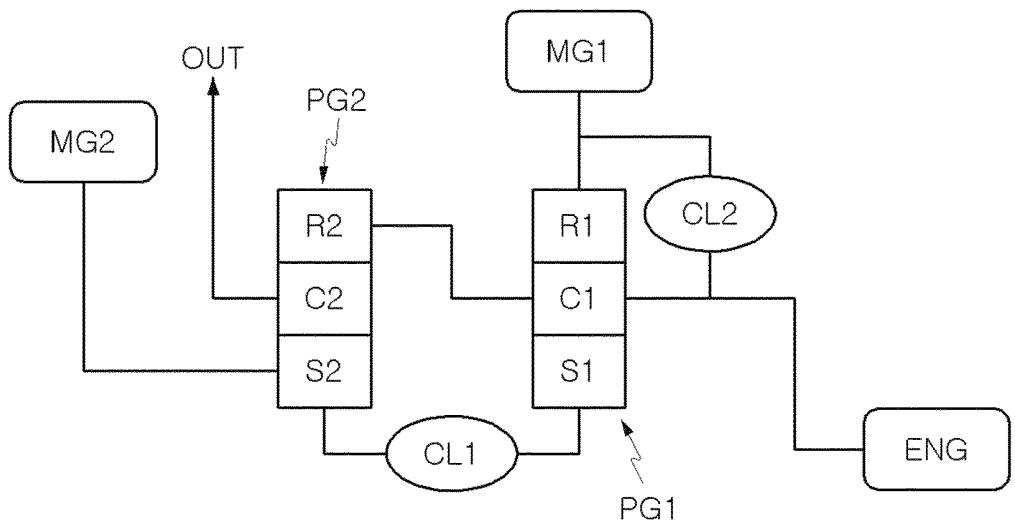
FIG. 2 is a diagram illustrating the configuration of a power train for a hybrid vehicle according to another embodiment of the present invention.

Referring to FIGS. 1 and 2, a power train for a hybrid vehicle in accordance with some embodiments of the present invention includes: a first planetary gear set PG1 that has rotary elements; a second planetary gear set PG2 that has rotary elements at least one of which is connected with at least one of the rotary elements of the first planetary gear set PG1; a first clutch CL1 that is configured to connect/disconnect the rotary element(s) of the first planetary gear set PG1 with/from the rotary element(s) of the second planetary gear set PG2; and a second clutch CL2 that is configured to connect/disconnect the rotary element(s) of the first planetary gear set PG1, in which at least two or more independent power sources and output element OUT are connected to the rotary element(s) of the first planetary gear set PG1 and/or the rotary element(s) of the second planetary gear set PG2.

The power source includes an engine ENG and a first motor generator MG1 that are connected to the first planetary gear set PG1 and a second motor generator MG2 that is connected to the second planetary gear set PG2. The output element OUT is connected to the second planetary gear set PG2. The first planetary gear set PG1 and the second planetary gear set PG2, and the first motor generator MG1 and the second motor generator MG2 are coaxially arranged.

One rotary element of the first planetary gear set PG1 is directly connected with one rotary element of the second planetary gear set PG2, and the first clutch CL1 is connected with one of the other rotary elements of the first planetary gear set PG1 and one of the other rotary elements of the second planetary gear set PG2.

The engine ENG is connected with the rotary element, which is directly connected to the second planetary gear set PG2, of the first planetary gear set, and the output element OUT is connected to one rotary element, which is not connected with the engine ENG and the first clutch CL1, of the second planetary gear set PG2.

The first motor generator MG1 is connected with the rotary element, which is not connected with the first clutch CL1 and the rotary elements of the second planetary gear set PG2, of the first planetary gear set PG1. The second motor generator MG2 is connected to the rotary element, which is connected with the first clutch CL1, of second planetary gear set PG2.

In an embodiment, as shown in FIG. 1, a first carrier C1 of the first planetary gear set PG1 is directly connected to a second ring gear R2 of the second planetary gear set PG2, the engine ENG is connected to the first carrier C1, the first motor generator MG1 is connected to a first ring gear R1 of the first planetary gear set PG1, the second motor generator MG2 is connected to a second sun gear S2 of the second planetary gear set PG2, the first clutch CL1 is configured to connect/disconnect a first sun gear S1 of the first planetary gear set PG1 with/from a second sun gear S2 of second planetary gear set PGs, the second clutch CL2 is configured to connect/disconnect the first sun gear S1 and the first carrier C1, and output element OUT is connected to a second carrier C2 of the second planetary gear set PG2.

In accordance with another embodiment, as shown FIG. 2, the first carrier C1 of the first planetary gear set PG1 is directly connected to the second ring gear R2 of the second planetary gear set PG2, the engine ENG is connected to the first carrier C1, the first motor generator MG1 is connected to the first ring gear R1 of the first planetary gear set PG1, the second motor generator MG2 is connected to the second sun gear S2 of the second planetary gear set PG2, the first clutch CL1 is disposed to connect/disconnect the first sun gear S1 of the first planetary gear set PG1 with/from the second sun gear S2 of the second planetary gear set PG2, the second clutch CL2 is disposed to connect/disconnect the first ring gear R1 with/from the first carrier C1, and the output element OUT is connected to the second carrier C2 of the second planetary gear set PG2.

The power trains in accordance with the embodiments can be operated in a complex split mode or an output split mode by operating the first clutch CL1 and the second clutch CL2.

In the power train of the embodiment of FIG. 1, the complex split mode is activated by engaging the first clutch CL1. That is, the lever analysis diagram shown at the upper side of FIG. 4 simplifies FIG. 1 and the diagram shown at the lower left side of the figure can be achieved by engaging only the first clutch CL1, in which the engine ENG (an input element) and the output element OUT are both spaced apart from the first motor generator MG1 and the second motor generator MG2, thereby achieving a complex split mode power train structure.

The complex split mode is a mode in which both of the first motor generator MG1 and the second mode generator MG2 are not connected with each other, but connected to the engine ENG or the output element OUT through the rotary elements of the planetary gear sets, and has the maximum efficiency at two mechanical points where the velocity of the first motor generator MG1 or the second motor generator MG2 is 0 in the entire shift ratio region.

In the lever analysis diagram shown at the upper side of FIG. 4, when the first clutch CL1 is disengaged and the second clutch CL2 is engaged, two elements of the first planetary gear set PG1 are connected with each other by the engagement of the second clutch CL2, and as a result, all elements of the first planetary gear set PG1 are locked to each other and operates as one rotary unit, such that this is expressed as shown at the right lower side of FIG. 4, in which the first motor generator MG1 is directly connected with the engine ENG thereby achieving the output split mode.

The output split mode has a mechanical point and shows the maximum efficiency at a shift ratio where the velocity of the second motor generator MG2 that is not directly connected with the engine ENG is 0. Therefore, it is possible to drive a vehicle in multiple modes that improve fuel efficiency of the vehicle by selecting the complex split mode and the output split mode by controlling the first clutch CL1 and the second clutch CL2 such that the vehicle can be driven in a high efficiency section.

Figure 5:
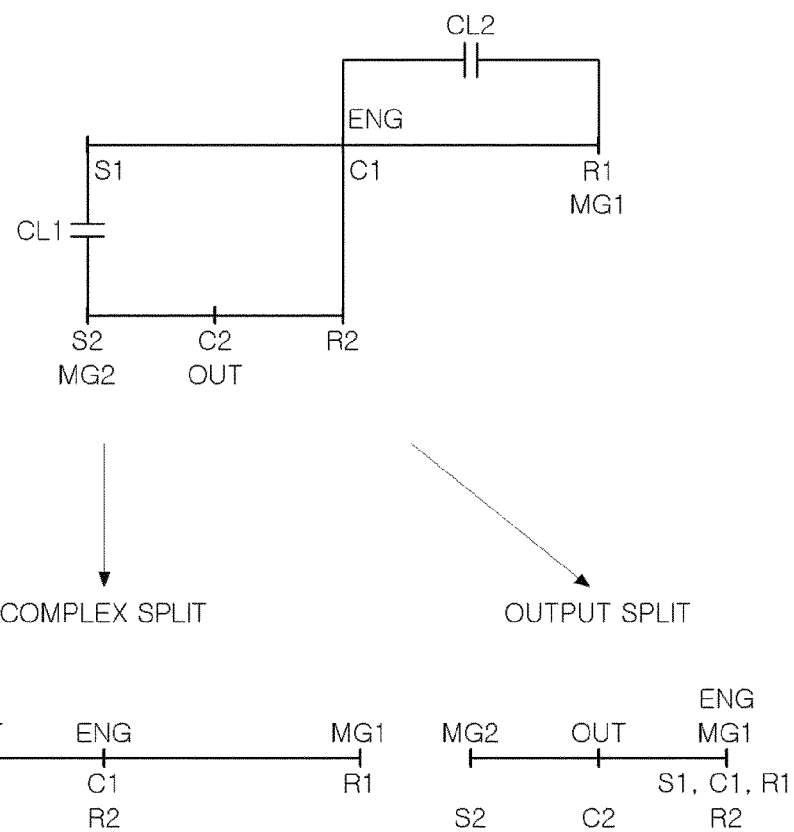
FIG. 5 show a simplified configuration of the power train of FIG. 2 and lever analysis diagrams of a complex split mode operation and an output split mode operation thereof.

Also, in the power train of the embodiment of FIG. 2, as shown in FIG. 5, the complex split mode and the output split mode can be achieved by operating the first clutch CL1 and the second clutch CL2.

Figure 6:
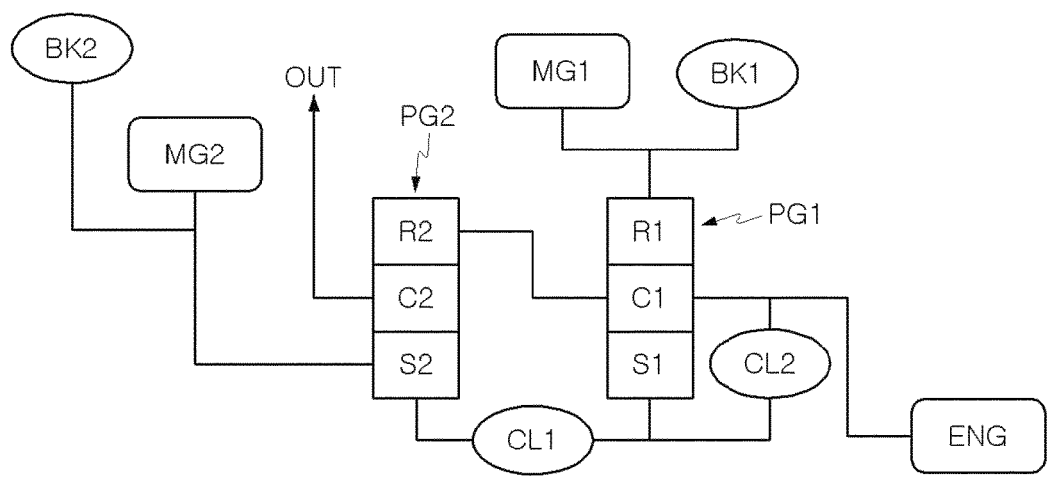
FIG. 6 is a diagram illustrating the configuration of a power train of still another embodiment of the present invention.
Figures 7, 8:
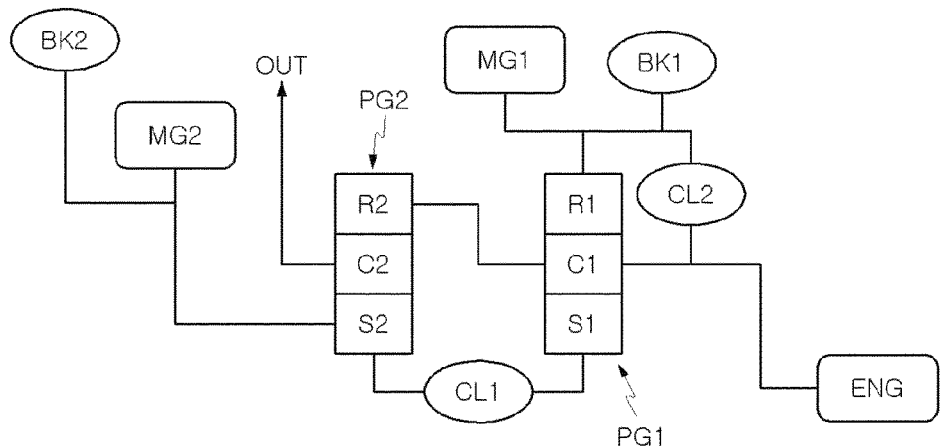
FIG. 7 is a diagram illustrating the configuration of a power train of yet another embodiment of the present invention.
FIG. 8 is an operation mode table for the power trains of FIGS. 6 and 7.

FIGS. 6 and 7 illustrates other embodiments of the present invention, which are further provided with a first brake that restrains rotation of the rotary element, which is connected with the first motor generator MG1, of the first planetary gear set PG1 and a second brake that restrain rotation of the rotary element, which is connected with the second motor generator MG2, of the second planetary gear set PG2, and are the same as the embodiments of FIGS. 1 and 2 in the other configurations.

The power train structure shown in FIG. 7 is different from that shown in FIG. 6 in the position of the second clutch CL2, as in the relationship between FIGS. 1 and 2; therefore. Detailed description of the structure and operation thereof is thus omitted.

Figure 9:
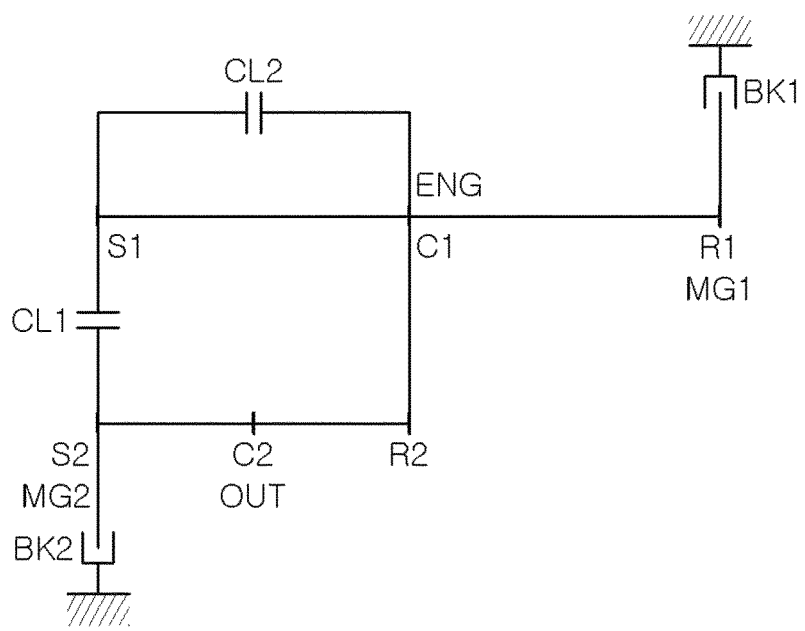
FIG. 9 is a simplified configuration of the power train of FIG. 6.

The power train structure of FIG. 6 can be operated in the modes as shownin in FIG. 8 and can be simplified as shown in FIG. 9

Figure 10:
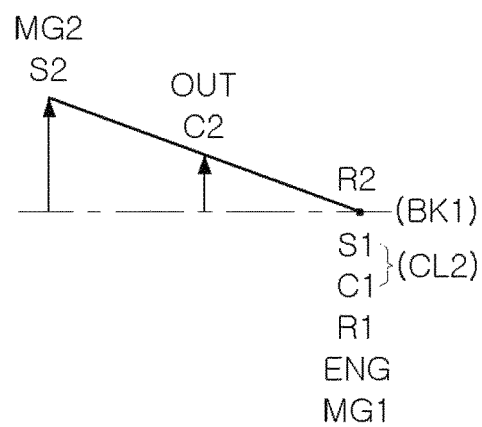

FIGS. 10 to 14 show lever analysis diagrams according to the modes of FIG. 8. In the electric vehicle EV mode, as shown in FIG. 10, the second clutch CL2 and the first brake BK1 are engaged, such that the first planetary gear set PG1 is locked as one rotary unit by the engagement of the second clutch CL2, and the first planetary gear set and the engine ENG and the first motor generator MG1 that are directly connected to the first planetary gear set are stopped by the first brake BK1.

As a result, driving force of the second motor generator MG2 is reduced and outputted to output the element OUT through the second carrier C2.

Figure 11:
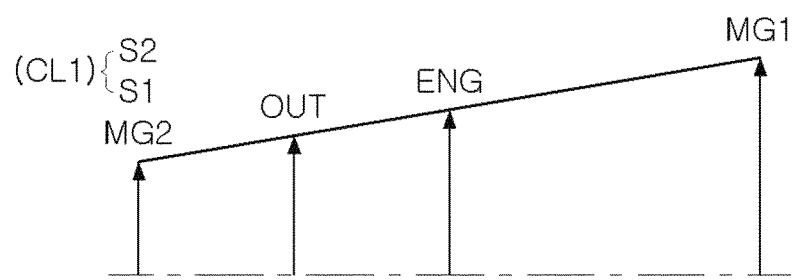

In the complex split mode, as shown in FIG. 11, only the first clutch CL1 is engaged. The engine ENG, the first motor generator MG1, and the second motor generator MG2 all can generate driving force and can supply power to the others to generate electricity, and it is possible to continuously change the shift ratio for the entire range required for the vehicle by appropriately controlling velocity of them.

Figure 12:
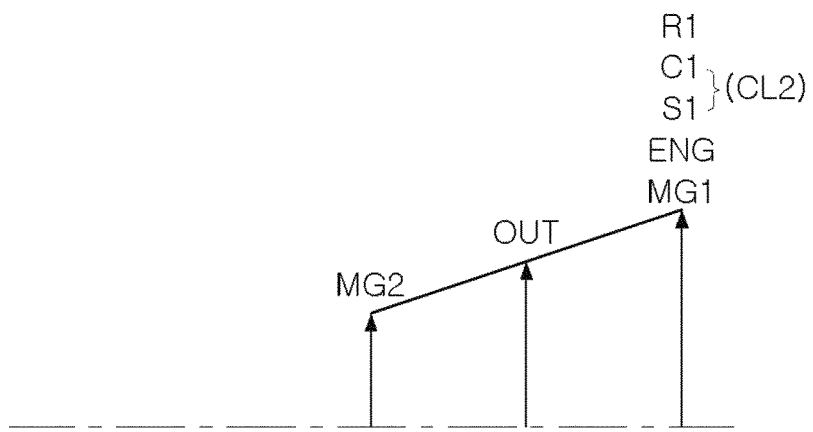

In the output split mode, as show in FIG. 12, only the second clutch CL2 is engaged. The first planetary gear set PG1, the engine ENG, and the first motor generator MG1, which are integrally connected by the second clutch CL2, rotate at the same velocity and the velocity of the output element OUT can be adjusted by controlling the velocity of the second motor generator MG2 involved in this configuration.

FIG. 13 illustrates a first stage fixed gear ratio mode, which includes three states depending on combinations of the clutch and the brake.

In the first state, the first clutch CL1 and the second clutch CL2 are engaged while the second planetary gear set PG2 forms a lever of one straight line together with the first planetary gear set PG1 by the first clutch CL1 and the left end of the lever is fixed by the second brake BK2, such that the engine ENG is operated, power is reduced by a predetermined shift ratio and outputted to the second carrier C2.

In the second state, the second clutch CL2 and the second brake BK2 are engaged while all elements of the first planetary gear set PG1 and the engine ENG and the first motor generator MG1, which are connected to the first planetary gear set PG1, rotate as one rotary unit together with the second ring gear R2 by engagement of the second clutch CL2 and second sun gear S2 is fixed by the second brake BK2, such that the driving force of the engine ENG is reduced by a predetermined shift ratio and outputted to the output element OUT through the second carrier S2.

In the third state, the first brake BK 1 and the second brake BK2 are engaged while the first carrier C1 and the second ring gear R2, which are connected with the engine ENG, in the first planetary gear set PG 1 and the second planetary gear set PG 2, rotate at the same velocity as the engine ENG, and the second carrier C2 of the second planetary gear set PG2 with the second sun gear S2 fixed by the second brake BK2 reduces and outputs the driving force of the engine ENG at a predetermined shift ratio, by the rotation of the second ring gear R2.

These states considerably contribute to ensuring smooth traveling by operating only the engine ENG when the first motor generator MG1 or the second motor generator MG2 is malfunctioning. Further, the first motor generator MG1 can assist the power of the engine ENG by generating driving force in the first and second states.

On the other hand, in a second stage fixed gear ration mode shown in FIG. 8, the first clutch CL1 and the second clutch CL2 are both engaged and the first planetary gear set PG1 and the second planetary gear set PG2 operate as one unit such that all the elements simultaneously rotate, such that power inputted from the engine ENG is completely transmitted to the output element OUT, thereby achieving a fixed shift ratio of 1:1.

Figure 14:
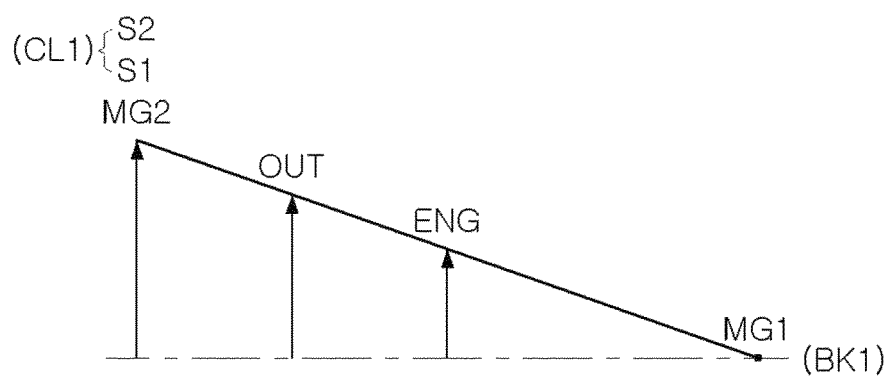

FIG. 14 illustrates a third stage fixed gear ratio mode, in which one long straight lever is formed by a straight lever showing the second planetary gear set PG2 and a straight lever showing the first planetary gear set PG1, which overlap each other, by engagement of the first clutch CL1, and the left end of the straight lever is fixed by engagement of the first brake BK 1 as shown in the figure, such that driving force of the engine ENG is increased and outputted by a predetermined shift ratio through the second carrier C2 of the second planetary gear set PG2. That is, fixed gear ratio overdrive traveling is achieved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power train for a hybrid vehicle comprising:
   a first planetary gear set including rotary elements;
   a second planetary gear set including rotary elements at least one of which is connected with at least one of the rotary elements of the first planetary gear set wherein the first planetary gear set and the second planetary gear set are coaxially arranged and one rotary element of the first planetary gear set is directly connected with one rotary element of the second planetary gear set;
   a first clutch that is configured to connect/disconnect one of the rotary elements of the first planetary gear set with/from one of the rotary elements of the second planetary gear set, wherein the first clutch is connected with a different rotary element of the first planetary gear set and a different rotary element of the second planetary gear set than the rotary elements that are directly connected between the first planetary gear set and the second planetary gear set;
   a second clutch that is configured to connect/disconnect the rotary elements of the first planetary gear set;
   an engine and a first motor generator connected to the first planetary gear set, wherein the engine is connected with the rotary element, which is directly connected to the second planetary gear set, of the first planetary gear set;
   a second motor generator connected to the second planetary gear set, wherein the first motor generator and the second motor generator are coaxially arranged; and
   an output element connected directly to one rotary element, which is not connected with the engine and the first clutch, of the second planetary gear set.

2. The power train for a hybrid vehicle as defined in claim 1, wherein the first motor generator is connected with the rotary element, which is not connected with the first clutch and the rotary elements of the second planetary gear set, of the first second planetary gear set and
   the second motor generator is connected to the rotary element, which is connected with the first clutch, of the second planetary gear set.

3. The power train for a hybrid vehicle as defined in claim 2, wherein a first carrier of the first planetary gear set is directly connected to a second ring gear of the second planetary gear set,
   the engine is connected to the first carrier,
   the first motor generator is connected to a first ring gear of the first planetary gear set,
   the second motor generator is connected to a second sun gear of the second planetary gear set,
   the first clutch is configured to connect/disconnect a first sun gear of the first planetary gear set with/from a second sun gear of the second planetary gear set,
   the second clutch is configured to connect/disconnect the first sun gear and the first carrier, and
   the output element is connected to a second carrier of the second planetary gear set.

4. The power train for a hybrid vehicle as defined in claim 2, further comprising:
   a first brake that is configured to restrain rotation of the rotary element, which is connected with the first motor generator, of the first planetary gear set; and
   a second brake that is configured to restrain rotation of the rotary element, which is connected with the second motor generator, of the second planetary gear set.

5. The power train for a hybrid vehicle as defined in claim 2, wherein a first carrier of the first planetary gear set is directly connected to a second ring gear of the second planetary gear set, the engine is connected to the first carrier, the first motor generator is connected to a first ring gear of the first planetary gear set, the second motor generator is connected to a second sun gear of the second planetary gear set, the first clutch is configured to connect/disconnect a first sun gear of the first planetary gear set with/from a second sun gear of the second planetary gear set, the second clutch is configured to connect/disconnect the first ring gear and the first carrier, and the output element is connected to a second carrier of the second planetary gear set.

6. The power train for a hybrid vehicle as defined in claim 5, further comprising:

a first brake that is configured to restrain rotation of the first ring gear connected with the first motor generator; and a second brake that is configured to restrain rotation of the second sun gear connected with the second motor generator.

7. The power train of claim 1, wherein the first planetary gear set has three rotary elements two of which are connected with the engine and the first motor generator, respectively; and the second planetary gear set has three rotary elements two of which are connected with the second motor generator and the first planetary gear set, respectively.

8. The power train for a hybrid vehicle as defined in claim 7, further comprising:

a first brake that is configured to restrain rotation of the rotary element, which is connected with the first motor generator, of the first planetary gear set; and a second brake that is configured to restrain rotation of the rotary element, which is connected with the second motor generator, of the second planetary gear set.

9. The power train for a hybrid vehicle as defined in claim 1, wherein the first clutch is configured to connect/disconnect the rotary element, which is connected with the second motor generator, of the second planetary gear set with/from the rotary element, which is not connected with the first motor generator and the engine, of the first planetary gear set.

10. The power train for a hybrid vehicle as defined in claim 9, wherein the second clutch is configured to connect/disconnect the rotary element, which is connected with the engine, of the first planetary gear set with/from the rotary element, which is connected with the first clutch, of the first planetary gear set.

11. The power train for a hybrid vehicle as defined in claim 9, wherein the second clutch is configured to connect/disconnect the rotary element, which is connected with the engine, of the first planetary gear set with/from the rotary element, which is connected with the first motor generator, of the first planetary gear set.

12. The power train of claim 1, wherein the first planetary gear set has three rotary elements two of which are connected with the engine and the first motor generator, respectively;

the second planetary gear set has three rotary elements two of which are connected with the second motor generator and the first planetary gear set, respectively;

a first brake that is configured to restrain rotation of the rotary element, which is connected with the first motor generator, of the first planetary gear set; and a second brake that is configured to restrain rotation of the rotary element, which is connected with the second motor generator, of the second planetary gear set, wherein the first clutch that is configured to connect/disconnect the rotary element of the first planetary gear set that is not connected to the engine and the first motor generator with/from the rotary element of the second planetary gear set that is connected to the second motor generator.

* * * * *